US012763711B2

(12) United States Patent
Kuehn et al.

(10) Patent No.: US 12,763,711 B2
(45) Date of Patent: Oct. 13, 2026

(54) METHOD FOR OPERATING AN ELECTRIC DRIVE SYSTEM

(71) Applicant: Lenze SE, Aerzen (DE)

(72) Inventors: Johannes Kuehn, Braunschweig (DE); Torben Jonsky, Hannover (DE)

(73) Assignee: Lenze SE, Aerzen (DE)

( * ) Notice: Subject to any disclaimer, the term of this patent is extended or adjusted under 35 U.S.C. 154(b) by 204 days.

(21) Appl. No.: 18/887,610

(22) Filed: Sep. 17, 2024

(65) Prior Publication Data

US 2025/0096713 A1 Mar. 20, 2025

(30) Foreign Application Priority Data

Sep. 18, 2023 (DE) ..................... 10 2023 125 209.7

(51) Int. Cl.
*H02P 21/13* (2006.01)
*H02P 23/00* (2016.01)
*H02P 23/12* (2006.01)
*H02P 23/14* (2006.01)

(52) U.S. Cl.
CPC .......... *H02P 23/0018* (2013.01); *H02P 23/14* (2013.01)

(58) Field of Classification Search
CPC .... G05B 11/01; G05B 17/02; G05B 13/0265; H02P 23/12; H02P 23/0018; H02P 23/14; H02P 21/13
USPC .......................................................... 318/445
See application file for complete search history.

(56) References Cited

U.S. PATENT DOCUMENTS

2013/0138290 A1* 5/2013 Falkenstein ......... B60W 50/023 701/32.8
2015/0326163 A1* 11/2015 Yamaguchi ............. H02P 21/13 318/400.02
2019/0294153 A1* 9/2019 Yamaguchi ............ G05B 19/18
2020/0198128 A1* 6/2020 Hatanaka ........... G05B 23/0272
2021/0311441 A1* 10/2021 Toku .................... G05B 13/041
2021/0357727 A1* 11/2021 Moribe ............... G01M 17/007

OTHER PUBLICATIONS

German-language Office Action issued in German Application No. 10 2023 125 209.7 dated Jun. 27, 2024 (3 pages).
Su, J. et al., “Disturbance Observer Based Fault Diagnosis”, Proceedings of the 33rd Chinese Control Conference, 2014, pp. 3024-3029 (6 pages).

* cited by examiner

*Primary Examiner* — Gabriel Agared
(74) *Attorney, Agent, or Firm* — Crowell & Moring LLP

(57) ABSTRACT

A method for operating an electrical drive system includes the steps of: acquiring a number of input variables pertaining to the electrical drive system; determining at least one state variable from the acquired input variables by way of an observer; determining at least one disturbance variable from the acquired input variables by way of the observer; controlling the electrical drive system on the basis of the at least one determined state variable; and monitoring the state of the electrical drive system by machine learning, the at least one disturbance variable forming input data for a machine learning model.

7 Claims, 2 Drawing Sheets

METHOD FOR OPERATING AN ELECTRIC DRIVE SYSTEM

BACKGROUND AND SUMMARY

The invention is based on the object of providing a method for operating an electrical drive system that permits the state of the electrical drive system to be monitored as simply and reliably as possible.

The method according to the invention is used to operate an electrical drive system and comprises the steps of: acquiring a number of input variables pertaining to the electrical drive system, for example between 2 and 10 input variables, determining at least one state variable from the acquired input variables by means of an observer, determining at least one disturbance variable from the acquired input variables by means of the observer, controlling the electrical drive system on the basis of the at least one determined state variable, inter alia, and monitoring the state of the electrical drive system by means of machine learning, the at least one disturbance variable forming input data for a machine learning model. Input variables pertaining to the observer may be, for example: an actual position of a load as measured by means of a motor sensor, a torque, or a motor current, a position of the load as measured by means of a load sensor, a target position of the load, etc.

In one embodiment, the electrical drive system comprises: an electric motor and a phase-rotation indicator or encoder mechanically coupled to the electric motor, and a mechanical load moved, or driven, by means of the electric motor, and a load sensor mechanically coupled to the mechanical load. Measured variables ascertained for the observer are selected from: a phase-rotation indicator position generated by means of the phase-rotation indicator, a load sensor position generated by means of the load sensor, and a torque generated by means of the electric motor.

In one embodiment, the state variable is a position and/or a speed of the mechanical load.

In one embodiment, the at least one disturbance variable represents a friction occurring in the electrical drive system.

In one embodiment, the at least one disturbance variable represents a torque generated by means of the electric motor.

In one embodiment, the observer is an extended Kalman filter.

In one embodiment, the state of the electrical drive system determined by means of machine learning is evaluated for the purpose of preventive maintenance of the electrical drive system.

According to the invention, machine learning is combined with physical model knowledge.

According to the invention, for example model-based sensor fusion of the load sensor with the phase-rotation indicator and the torque can be carried out in order to obtain a more accurate position and speed of the mechanical load. This can be accomplished by using an extended Kalman filter as an observer, for example. The extended Kalman filter is an observer that also estimates the disturbance variables, i.e. calculates, or assesses, errors in the measurements. The variances between the measurement and the calculation are plausibility checked.

The invention is based on the insight that the observed values, in particular the disturbance variables, are not only suitable for showing whether the observer is working. They also indicate whether a state of the electrical drive system changes. An increasing friction or other changes lead to variances between the values determined in the model and the values from the real measurements. The estimated disturbance variables in the observer therefore increase significantly.

According to the invention, the observer is used with a disturbance variable estimator to generate additional data that are better suited as input data for machine learning for the purpose of condition monitoring than data such as torque, speed, etc. The disturbance variables determined by means of the observer provide information about changes in reality compared with the model directly and immediately. It is possible to observe variables for which no or only poor measurements exist. The disturbance variables compress information considerably compared with measured values. The use of an observer in order to evaluate data is a way of making better statements with fewer measurements. Additionally, the evaluation of the disturbance variables is well suited to learning condition monitoring by means of machine learning without previously labeled measurements, for example labeled as “good” or “corrupt” measurement.

The use of an observer to estimate friction or other disturbance variables also permits a specific statement about the machine state to be made with only a few values, for example 2 values. This reduces the need to transmit a large amount of data to an evaluation unit.

In addition to reconstructed measurement and state variables, such as position and speed, the observer according to the invention also outputs disturbance variables. This is accomplished by calculating the disturbance variables in the same way as other states. By way of example, the disturbance variable may be a torque. The greater the variance of the response of the drive system compared with the drive system model, the greater the disturbance variable becomes. If the drive system responds in the same way as the associated drive system model, the disturbance variables disappear. By way of example, the torque is then 0 Nm.

As a result of the use of the disturbance variables in machine learning, the AI methods become simpler, for example a simple decision tree suffices, fewer data are needed and the methods are more easily transferrable to different drive systems. It is no longer necessary to train from zero. Only the limits for the decision tree need to be adapted. This can also be done by way of a model, in principle.

If an observer is already used for the drive system, for example, as in accordance with the invention, for sensor fusion, it is also a simple matter to use the observer for preventive maintenance (condition monitoring).

The invention permits optimized use of machine learning, for example for condition monitoring or preventive maintenance, with lower hardware costs. The observer provides a dual benefit in this case, specifically optimizing sensor signals and generating input data for the machine learning model.

The invention is described in detail hereinbelow with reference to the drawings.

DETAILED DESCRIPTION OF THE DRAWINGS

Figure 2:
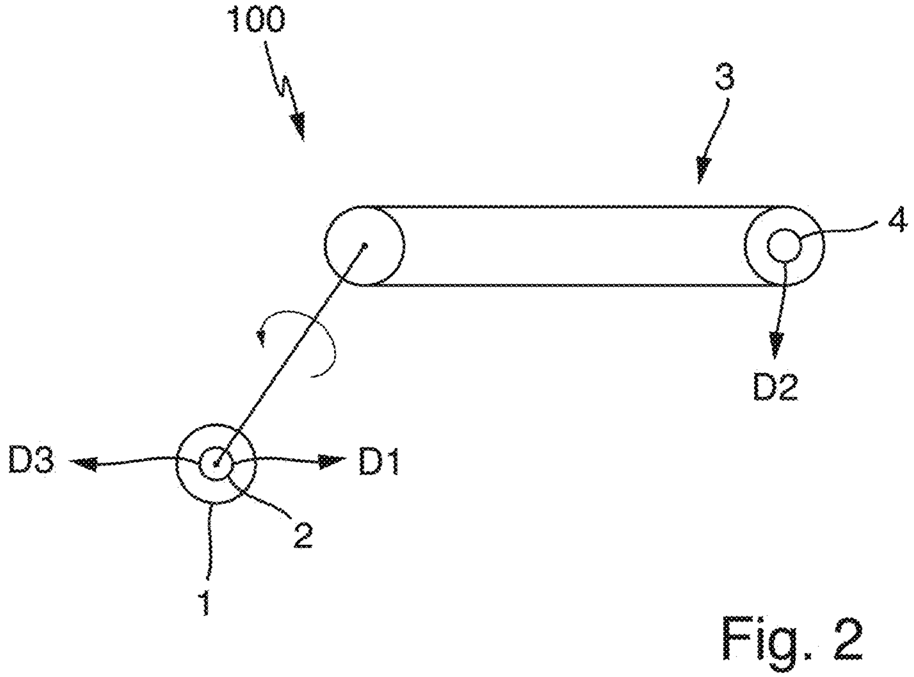
FIG. 2 schematically shows a block diagram of an electrical drive system.

FIG. 2 shows a block diagram of an electrical drive system 100 with an electric motor 1 and a phase-rotation indicator, or encoder, 2 mechanically coupled to the electric motor 1. The electrical drive system 100 also comprises a mechanical load 3 moved by means of the electric motor 1 and a load sensor 4 mechanically coupled to the mechanical load 3.

Figure 1:
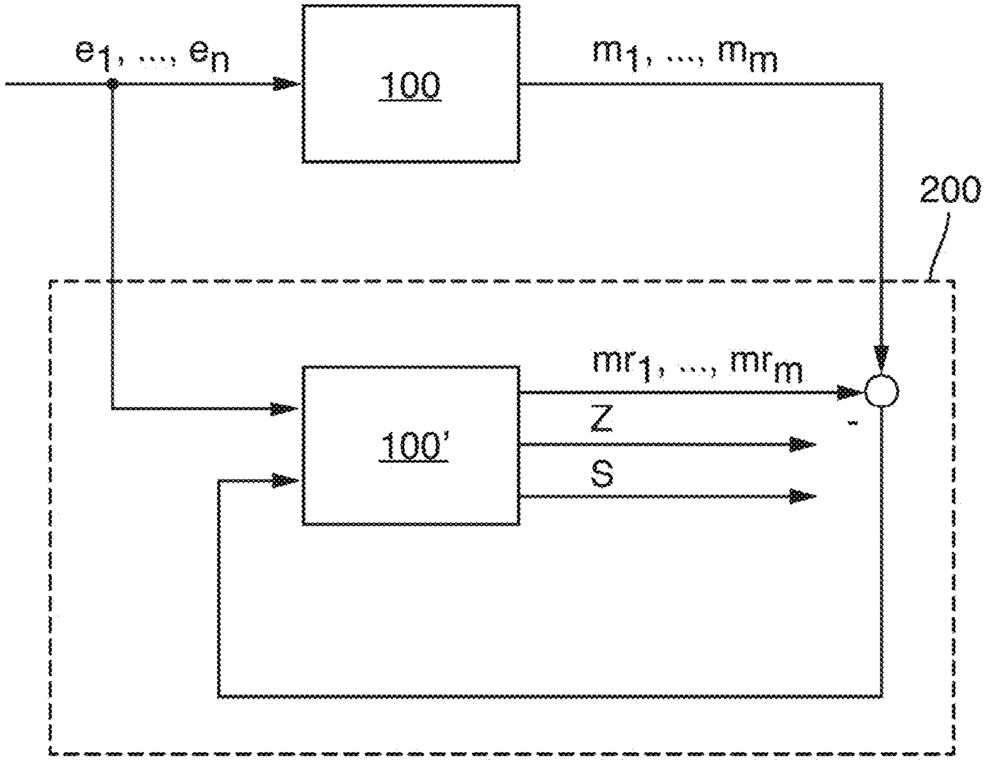
FIG. 1 schematically shows a block diagram of an observer.

FIG. 1 schematically shows a block diagram of an observer in the form of an extended Kalman filter 200, which uses a model 100' of the electrical drive system 100 to determine estimated measured variables $m_{r1}, \ldots, m_{rm}$, at least one state variable Z and at least one disturbance variable S from a number of input variables $e_1, \ldots, e_n$ pertaining to the electrical drive system 100, inter alia. It holds that n=2, 3, . . . and m=2, 3, . . . .

The at least one disturbance variable S can represent a friction occurring in the electrical drive system 100 and/or a torque generated by means of the electric motor 1, for example.

In respect of the basic design and basic function of observers, or extended Kalman filters, reference will also be made to the relevant specialist literature.

Measured variables $m_1, \ldots, m_m$ ascertained for the observer 200 are for example selected from a phase-rotation indicator position D1 generated by means of the phase-rotation indicator 2, a load sensor position D2 generated by means of the load sensor 4, and a torque D3 generated by means of the electric motor 1, see also FIG. 2.

The state variable(s) Z may be a position and/or a speed of the mechanical load 3.

The electrical drive system 100 is controlled on the basis of the at least one determined state variable Z.

Figure 3:
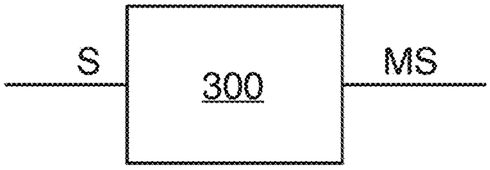
FIG. 3 shows a block diagram of a machine learning model for monitoring the condition of the electrical drive system.

FIG. 3 shows a block diagram of a machine learning model 300 for condition monitoring and preventive maintenance of the electrical drive system 100, the at least one disturbance variable S forming input data for the model 300 and the model calculating a machine state MS on the basis of the at least one disturbance variable S.

The invention claimed is:

1. A method for operating an electrical drive system, the method comprising the steps of:

acquiring a number of input variables (e1, . . . , en) pertaining to the electrical drive system;

determining at least one state variable (Z) from the acquired input variables (e1, . . . , en) via an observer;

determining at least one disturbance variable (S) from the acquired input variables (e1, . . . , en) via the observer;

controlling the electrical drive system based on the at least one determined state variable (Z); and monitoring a state of the electrical drive system via machine learning, the at least one disturbance variable (S) forming input data for a machine learning model, wherein the electrical drive system comprises an electric motor, a phase-rotation indicator mechanically coupled to the electric motor, a mechanical load moved by the electric motor, and a load sensor mechanically coupled to the mechanical load.

2. The method according to claim 1, wherein measured variables (m1, . . . , mm) ascertained for the observer are selected from:

a phase-rotation indicator position (D1) generated by the phase-rotation indicator, a load sensor position (D2) generated by the load sensor, and a torque (D3) generated by the electric motor.

3. The method according to claim 2, wherein the at least one state variable (Z) is a position and/or a speed of the mechanical load.

4. The method according to claim 1, wherein the at least one disturbance variable (S) represents a friction occurring in the electrical drive system.

5. The method according to claim 1, wherein the at least one disturbance variable (S) represents a torque generated by the electric motor.

6. The method according to claim 1, wherein the observer is an extended Kalman filter.

7. The method according to claim 1, wherein the state of the electrical drive system determined by machine learning is evaluated for a purpose of preventive maintenance of the electrical drive system.

* * * * *